United States Patent
Visee

(10) Patent No.: US 7,161,133 B2
(45) Date of Patent: Jan. 9, 2007

(54) METHOD AND DEVICE FOR EVALUATING A PARAMETER OF A MOVING OBJECT

(76) Inventor: Christian Visee, Avenue Général Leman 35, B-7022 Hyon (BE)

( * ) Notice: Subject to any disclaimer, the term of this patent is extended or adjusted under 35 U.S.C. 154(b) by 361 days.

(21) Appl. No.: 10/476,207

(22) PCT Filed: Apr. 23, 2002

(86) PCT No.: PCT/BE02/00059

§ 371 (c)(1),
(2), (4) Date: May 18, 2004

(87) PCT Pub. No.: WO02/088756

PCT Pub. Date: Nov. 7, 2002

(65) Prior Publication Data

US 2005/0072902 A1    Apr. 7, 2005

(30) Foreign Application Priority Data

Apr. 27, 2001  (BE) ................................. 2001/0290

(51) Int. Cl.
*G06M 7/00* (2006.01)
*G01V 8/00* (2006.01)

(52) U.S. Cl. ................................. 250/221; 250/559.32

(58) Field of Classification Search ...................... None
See application file for complete search history.

(56) References Cited

U.S. PATENT DOCUMENTS

| 4,495,589 A | 1/1985 | Hirzel ......................... 364/565 |
| 4,580,894 A * | 4/1986 | Wojcik ......................... 356/28 |
| 4,671,650 A | 6/1987 | Hirzel et al. ................... 356/28 |
| 6,118,132 A | 9/2000 | Tullis ..................... 250/559.39 |

FOREIGN PATENT DOCUMENTS

WO       WO 96/22537        7/1996

* cited by examiner

*Primary Examiner*—Que Le
*Assistant Examiner*—Pascal M. Bui-Pho
(74) *Attorney, Agent, or Firm*—Hovey Williams LLP

(57) ABSTRACT

A method for measuring a parameter of a movement of an object, in which a series of successive first time-spaced linear images and a second spaced linear image are taken, (a) a first development of first linear images and (b) a second development consisting of at least one second image are formed, and linear images of the first development are compared at least partly with at least a part of a linear image of the second development to determine the part of a spaced linear image of the first development which best corresponds to a part of a linear image of the second development.

46 Claims, 7 Drawing Sheets
(2 of 7 Drawing Sheet(s) Filed in Color)

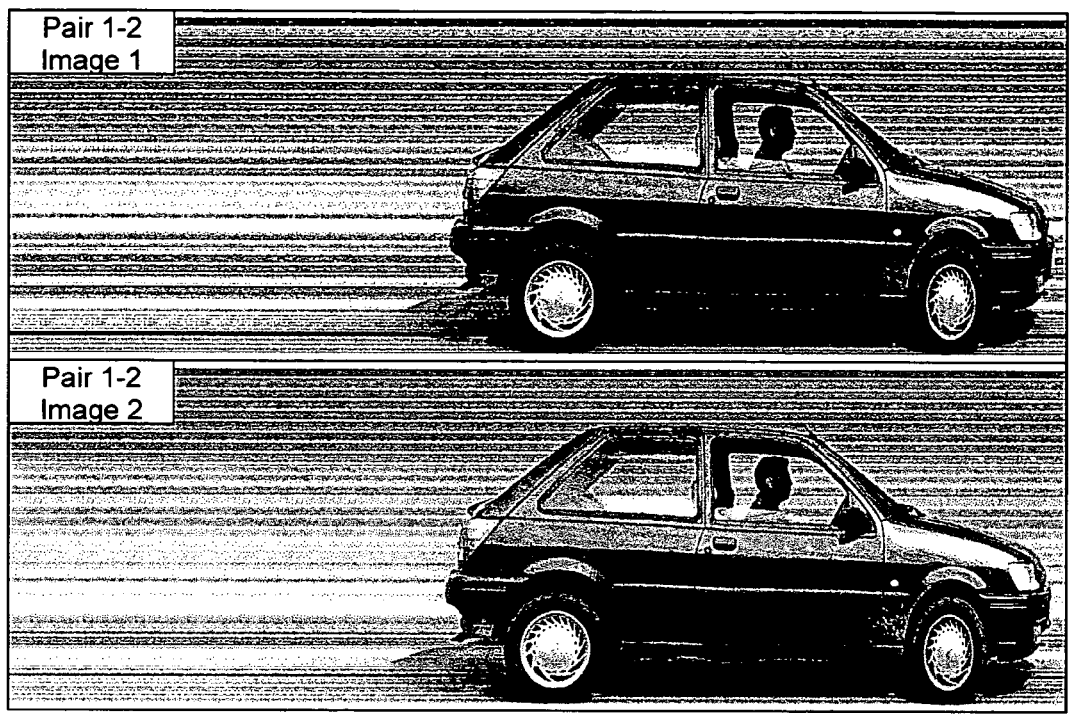
Figures 7A et 7B

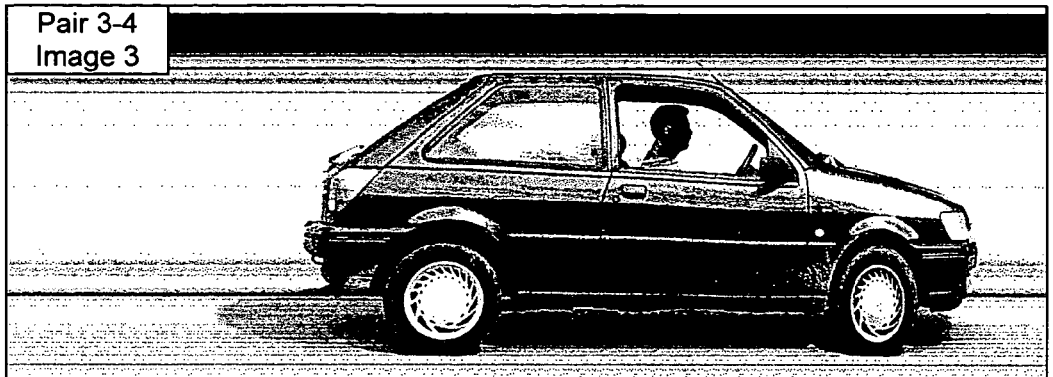
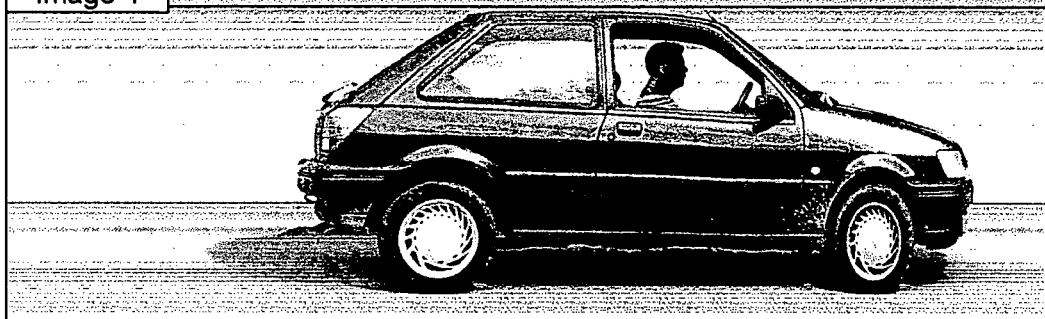
Figures 7C et 7D
Figures 7E et 7F
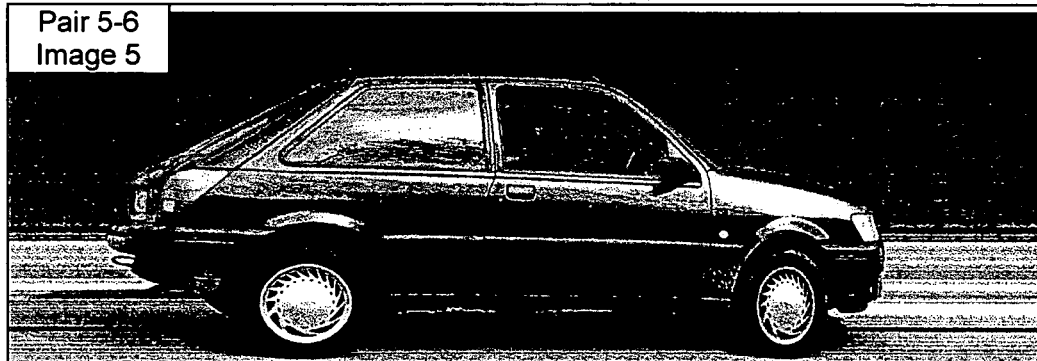
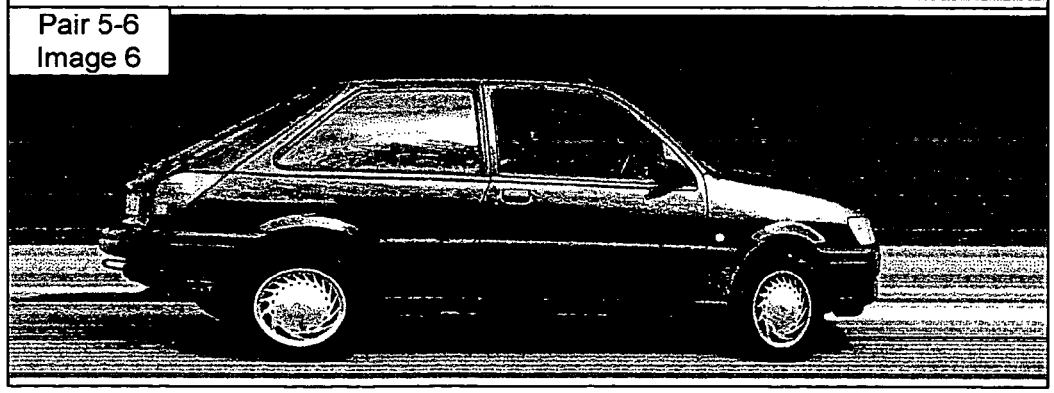

METHOD AND DEVICE FOR EVALUATING A PARAMETER OF A MOVING OBJECT

This is a national phase application under 35 U.S.C. §371 of International Application PCT/BE02/00059 filed Apr. 23, 2002 which claims priority under PCT Rule 4.1 and the Paris Convention to Belgium Application 20010290 filed Apr. 27, 2001.

BACKGROUND OF THE INVENTION

1. Field of the Invention

The object of this invention is a method and a device for evaluating a parameter relative to the movement of an object from images.

2. Description of the Prior Art

From document U.S. Pat. No. 4,495,589 we know a method for determining the speed of an airplane, in which at time t1 one takes an aerial photograph of the ground and at time t2 a second aerial photograph, in which one looks for the zone of the photograph taken at time t2 which corresponds to a zone of the photograph taken at time t1. On the basis of these photographs, one determines the distance of shift of the photograph taken at time t2 compared with the photograph taken at time t1. Knowing the difference in time (t2−t1), the altitude of the airplane and the distance of shift in the photographs, one can determine a speed of movement for the airplane.

This method requires a precise analysis of the two photographs to determine the zone where the two photographs intersect. The method according to document U.S. Pat. No. 4,495,589 does not have a great degree of precision when the ground or the objects are close to the camera given the great difference in angle of the two shots of one single zone. Furthermore, the method is unable to give an almost instantaneous speed, constantly evaluated, of the airplane. In this method, one compares parts of images, recorded by a single linear sensor and shot from varying and very different angles.

One knows from document U.S. Pat. No. 4,671,650 an apparatus similar to that represented in U.S. Pat. No. 4,495,589, except that images of radiation energy are taken from the ground by two matrix cameras.

One also knows from document WO96/22537 a system for measuring distance and speed. In this system, two cameras, with parallel lines of vision, are used. One then determines the angular deviation of the object in relation to the lines of vision of the two cameras. To determine a speed, the cameras take pictures at times T1 and T2, and at every time T1 and T2 one determines the position of the target on the basis of the pictures taken respectively at time T1 and time T2. This determining can if necessary be done by determining the sum of the differences of pixel intensity of the lines of vision on the left and those on the right. In this system, pictures are taken at specific times to determine the distance or the speed of an object. There is therefore no question of a development of linear pictures in this method.

The system in this document is adapted to determine speeds of objects moving towards the cameras or away from them in a direction parallel to the vision directions of the cameras. In fact, if the moving object is moving perpendicularly to the vision directions of the cameras, the object will quickly go out of the field of vision of each of the cameras.

In the method according to WO96/22537, one does not compare a development of second linear images with a development of first linear images to determine a first linear image best corresponding to a second linear image and the time difference associated with this correspondence of linear images.

SUMMARY OF THE INVENTION

The present invention aims at a simple method for determining a parameter relative to the movement of an object relative to a sensor, for example to determine a period of time, a distance, a speed, an angle and/or an acceleration of this object. In particular, one measures a period of time (for example, the difference between the time when one takes a second linear image and the time when one takes a first linear image corresponding to that second linear image) to determine from that either a speed, or a distance or an acceleration.

According to the invention, the method for characterising, at least partially, a relative movement of an object in relation to a measuring device determines or measures at least one parameter, in particular a parameter which is a function of time (such as a discrepancy in time or a difference in time) associated to the movement of an object in relation to a measuring device. This method includes the following stages:

by means of a measuring device, from a determined first time, one takes a series of successive first linear images (for example 3, 5, 10, 20, 50 or many more), at a determined interval of time, and at least as of a second determined time later than the first determined time, a second linear image or a series of second linear images of the relatively moving object, this or these secondary linear images being taken in a direction forming an angle with the shot direction of the first image, these first and second linear images being images spaced from each other, one thus forms (a) a first development of images as a function of time consisting of at least a series of first linear images spaced in time taken as of the first determined time and (b) a second development of images consisting of at least a second linear image taken at a time later than the first determined time and advantageously of a series of spaced second linear images taken at a determined interval of time, in which one compares, at least partially, one or more linear images from the first development with at least a part of a linear image of the second development to determine the part of the spaced linear image from the first development which best corresponds to a part of a linear image from the second development and to determine at least one of the said parameters, in particular a parameter in function of time, for which at least a part of the first spaced image best corresponds to a part of the second linear image.

Advantageously, the first linear images are taken at regular, roughly regular or irregular intervals of time. The time interval separating the shooting of two images can be variable or not, but is preferably roughly constant. The time interval separating the shooting of two linear images can be very small, for example less than a second, in particular less than 0.1 second, advantageously less than 0.01 second, preferably less than 0.001 second, such as, for example, 0.0001 second, 0.000005 second or even less than 0.000001 second.

When one takes a series of spaced second linear images, one takes the second images at regular or irregular intervals of time. The interval of time separating two shots can be variable or not but is preferably roughly constant. The interval of time separating the shooting of two linear images can be very small, for example less than a second, in particular less than 0.1 second, advantageously less than 0.01 second, preferably less than 0.001 second, such as for example 0.00001 second, 0.000005 second or even less, such as 0.000001 second. The interval of time between two shots of second linear images is for example roughly equal to the interval of time between two shots of first linear images. In accordance with a particular form of realisation, the interval of time between two shots of second linear images is either smaller or greater (advantageously greater, for example twice as great) than the interval of time between two shots of first linear images.

Preferably, one takes the first linear images in a first direction and the second linear image or images in a second direction, this second direction forming an angle with the said first direction of less than 10°, advantageously less than 5° and preferably less than 3°. Advantageously, the sensor zone of the first linear images and the sensor zone of the second linear images are at most 2 cm distant from each other, in particular less than 1 cm, for example less than 0.5 cm, such as less than 0.3 cm, 0.2 cm, 0.1 cm or even less (the distance of a few pixels in the case of a bi-linear sensor).

Advantageously, in the Method According to the Invention,
  With a measuring device, as of a first determined time, one takes a series of successive first linear images, at a determined interval of time, and at least, as of a second determined time later than the first determined time, a series of second linear images of the object in relative movement,
  one thus forms (a) a first development of images in function of time consisting of at least a series of first linear images spaced in time, taken as of a first determined time and (b) a second development of images consisting of a series of spaced second linear images taken at a determined interval of time, and
  one compares, at least partially, one or more linear images of the first development with at least a part of one or more linear images of the second development to determine the part of one or more spaced linear images of the first development which best corresponds to a part of one or more linear images of the second development and to determine at least one of the said parameters (for example, difference in time) for which at least a part of a first spaced linear image best corresponds to a part of a second linear image.

According to a particular method, one takes a series of groups of spaced first linear images of the object in relative movement as of a first determined time, the said groups of images being spaced in time (for example, taken at regular or irregular, but pre-defined, intervals), and at least one group of second linear images taken at a time later than the first determined time, advantageously a series of groups of spaced second linear images, at least taken as of a time later than the first determined time and at a determined interval of time (constant or not, but preferably constant).
  one forms (a) a first development of images in function of time consisting at least partially of a series of groups of first linear images taken as of a first determined time and (b) a group of second images or, advantageously, a second development consisting at least partially of a series of groups of second linear images in function of time taken from a different angle in relation to the shot direction of the group of first linear images, and
  one compares at least partially a part of groups of linear images of the first development with at least a part of a group or groups of second linear images, advantageously groups of second linear images of the second development, to determine the part of the group of linear images of the first development which best corresponds with a part of the group of second linear images or a part of a group of second linear images and to determine the parameter for which at least a part of a group of linear images of the first development best corresponds with a part of the group of second linear images or to a part of a group of second linear images of the second development.

Preferably,
  one determines, at least for a part of the linear images of the first development, a factor of correspondence or a discrepancy of correspondence with a second linear image or several linear images of at least a part of the second development,
  one determines the maximum of the factor of correspondence or the minimum of discrepancy of correspondence to determine the spaced linear image or the group of spaced linear images of the first development which best corresponds with a second linear image or a group of second linear images of the second development, and
  one determines the parameter for which a linear image or a group of linear images of the first development best corresponds to a second linear image or a group of second linear images of the second development.

According to a form of advantageous realisation, one filters, at least partially, the linear image or images and/or the first and/or the second development before determining the first linear image or the group of first linear images of which at least a part best corresponds with a part of a second linear image or a group of second linear images.

For example, in a method according to the invention, one determines the distance between the measuring device and the object in movement relative to the measuring device or one places the measuring device at a distance which is known at least for a given time in relation to the object in movement relative to the measuring device.

Advantageously, one determines a relative speed of the object in relation to the measuring device or the sensor from:
  the discrepancy or ΔT or the period of time separating the taking of a first spaced linear image or of a first group of spaced linear images and the taking of a second linear image or of a group of linear images, for which at least a part of a first spaced linear image or of a spaced group of first linear images best corresponds to a part of a second linear image or group of second linear images,
  the distance (Di) between the object and the sensor, and
  the angular difference (α) between the shot direction of linear images and/or the lens of the camera and/or the distance separating the two linear sensors.

According to a variant of the method following the invention, one determines the distance separating the object and the sensor from:
  the discrepancy or ΔT or the period of time separating the taking of a first spaced linear image or of a first spaced group of linear images and the taking of a second linear image or of a group of linear images, for which at least a part of a first spaced linear image or of a first spaced group of linear images best corresponds to a part of a second linear image or group of second linear images,
  the angular difference (α) between the shot directions of linear images (1A, 1B),
  the relative speed separating the object from the sensor.

According to a particularity of a method following the invention, one carries out, for one or more linear images (or group of linear images) a compensation in function of the distribution of light on the sensor and/or of differences of sensitivity of the pixels of linear elements of the sensor and/or of differences or variations bringing about systematic errors in the comparison of the linear images or groups of linear images.

When one determines a speed of movement, the error arises essentially from a variation in the object/sensor distance, whereas when one determines an object/sensor distance, the error arises essentially from a variation of the speed of the object relative to the sensor.

According to a particularly advantageous particularity, the first linear image or images or second linear images are each formed of a series of pixels, for example more than 100 pixels, advantageously more than 500 pixels, preferably more than 1000 pixels, for example from 5000 to 8000 pixels or even much more.

According to a preferred form of realisation, the first linear image or images or second linear images (formed of a series of pixels) are taken by one or more sensors defining a reception plane (a plane in which the sensor or sensors function), and the object undergoes a movement relative to the sensor or sensors parallel to the reception plane.

According to another possible form of realisation, the sensor undergoes a rotation movement, in particular on itself, in addition to the relative movement (in particular of shift) of the object relative to the sensor.

The invention also has as its object a measuring device for effecting a method according to the invention, the said device consisting of at least:

- a sensor set (1) taking at least one first linear image (1A) by a first means of sensing and at least one series of second linear images (1B) by a second means of sensing, in particular taken at successive times, the said second linear images being taken at a different angle in relation to the first linear image,
- a means (11) generating a series if first images (1A) spaced in time (RtdX),
- a comparison device (6) receiving signals from the sensor set (1) and from the means (11) generating a series of first images spaced in time, this means of comparison comparing at least partially the series of first images spaced in time with at least one second linear image and determining for at least a part of the series of first spaced images a factor of correspondence or a gap in correspondence with at least a part of a second linear image, this comparison device being programmed or associated to a processor determining a parameter (in particular in function of time) corresponding to a maximum correspondence factor or to a minimum of correspondence gap between at least a part of a first linear image spaced in time and at least a part of a second linear image.

Advantageously, the first means of sensing is designed to take a first linear image or a group of linear images in a first direction, while the second means of sensing is designed to take a linear image or a group of linear images in a second direction, this second direction forming an angle with the said first direction of less than 10°, advantageously less than 5°, preferably less than 3°.

Advantageously, the sensor zone of the first linear images and the sensor zone of the second linear images are less than 2 cm apart from each other, in particular less than 1 cm, for example less than 0.5 cm, such as less than 0.3 cm, 0.2 cm, 0.1 cm or even less (a distance of a few pixels in the case of bi-linear sensor).

According to a particular form of realisation, the sensor set (1) takes linear images in the form of a set of pixels and attributes to each pixel or to a series of pixels a parametric value, in particular a difference of potential, the said set containing moreover a means of correction of the parametric value attributed to pixels or groups of pixels of a second linear image or group of second linear images and/or of first linear images spaced in time or groups of first linear images spaced in time, in function of the distribution of light and/or differences or variations bringing about systematic errors in the comparison of the images and/or of differences of sensitivity of one or more means of sensing.

In particular, the device contains a sensor, at least bi-linear, defining an image reception plane and a focusing lens focusing an image of the object in relative movement on the said reception plane of the sensor.

According to another advantageous particularity, the device contains:

- a sensor with at least a first means sensing a first series of rows of pixels or lines of an image and a second means sensing a second series of rows of pixels or lines of the image at least partially distant from the pixels of the first row (the distance separating the said first and second series of rows or lines is for example a multiple of the size of a pixel, the said rows or lines being preferably parallel with each other),
- a delay-memory which memorizes at least partially the first series of rows of pixels or lines (for example one or several lines or portions of lines) and which emits, with pre-determined delays, the values memorized corresponding to the said first series of rows of pixels or lines,
- a comparison device receiving signals from the sensor corresponding to the values of the pixels of the second series of rows or lines over time, and signals coming from the delay-memory, the said comparison device being programmed or being linked to a processor to determine the delay to attribute to the first series of rows of pixels or lines for which the values memorized corresponding to the said first series of rows of pixels best correspond to the values of the second series of rows of pixels.

Preferably, the comparison device determines, for delays pre-determined by the delay-memory, a difference of value of pixels between the pixels of the first series of rows or lines taken at different moments and the value of the pixels of the second series of rows or lines, and emits signals containing differences in values of pixels associated to pre-determined delays to a processor determining by interpolation or extrapolation or approximation or successive iteration the delay or the parameter for which the difference of value of pixels is minimal.

According to a possible form of realisation, the device includes a focusing lens containing a cylinder lens and/or distinct focusing lenses for each means receiving a row of pixels and/or one or more filter for the linear images.

According to an advantageous detail, the device includes a means of quality control of the delay or parameter determined by the processor, this means advantageously including a means for determining a factor of quality from signals coming from the processor and an attenuator receiving the determined factor of quality and weighting the delay or the parameter determined by the processor in function of the factor of quality. The factor of quality is for example a degree of probability which is used to weight the different delays determined. Such a weighting is for example carried out by means of a Kalman filter.

Advantageously, the device includes a low-channel filter to attenuate in particular errors due to the tri-dimensional form of the object in relative movement and other high-frequency noises introduced in the measurements.

The sensor set advantageously receives signals from the comparison device or the processor or the attenuator to adapt the frequency of taking linear images and/or an increment of delay.

The sensor set is advantageously a set which takes at least one first linear image in at least two colours and at least a second linear image in at least two colours.

For example, the sensor set receives 5 linear images or more than five linear images. For example, the sensor set consists of 2 linear sensors or more than two linear sensors, in particular two or more than two linear sensors for checking the speed and 3 colour linear sensors for acquiring colour images. The sensor set can also be a matrix sensor which can be addressed line by line. Such a matrix sensor can by itself comprise several linear sensors or pairs of linear sensors. In the case of a matrix sensor comprising several pairs of linear sensors, the measurements obtained by each of the pairs can be used to contribute to a more precise and reliable final result.

Particularities and details of the invention will come out of the following description in which reference is made to the illustrations annexed.

BRIEF DESCRIPTION OF THE DRAWINGS

The patent or application file contains at least one (1) drawing executed in color. Copies of this patent or patent application publication with color drawing(s) will be provided by the Office upon request and payment of the necessary fee.

FIGS. 7A–7B, 7C–7D, 7E–7F are developments of images taken respectively by the first pair of lines, the second pair of lines and the third pair of lines.

DESCRIPTION OF THE PREFERRED EMBODIMENT

Figure 1:
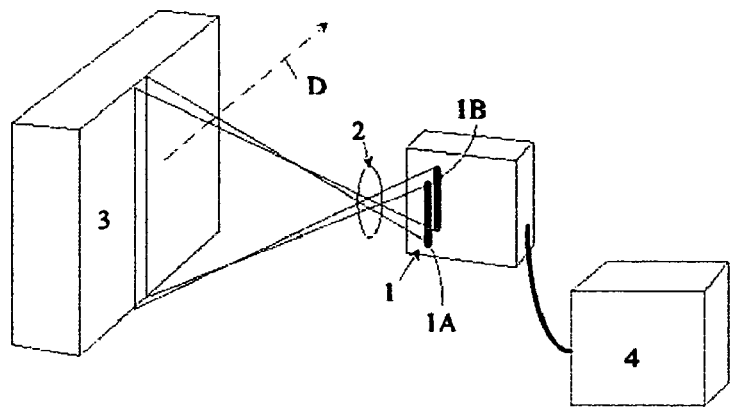
FIG. 1 is a schematic view representing the measuring device used to determine the speed of a moving object.
Figure 2:
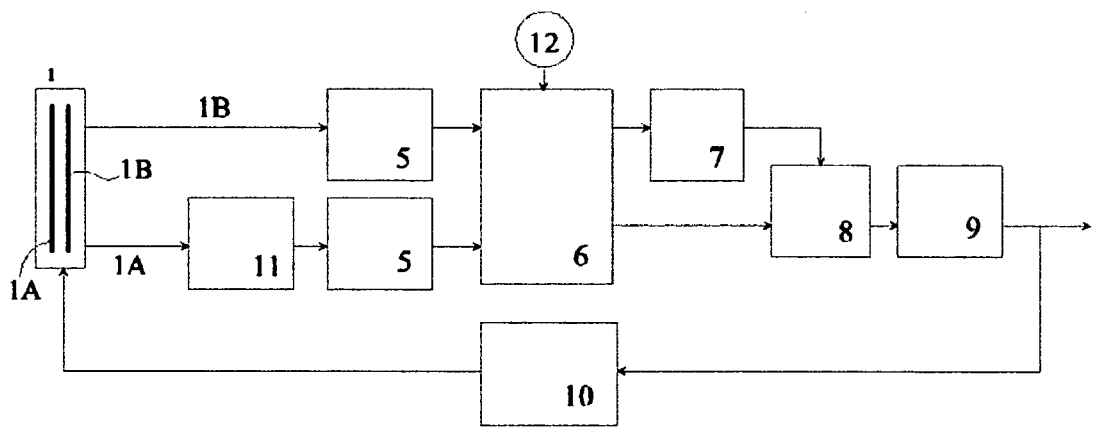
FIG. 2 is a schematic view of a measuring device.
Figure 3:
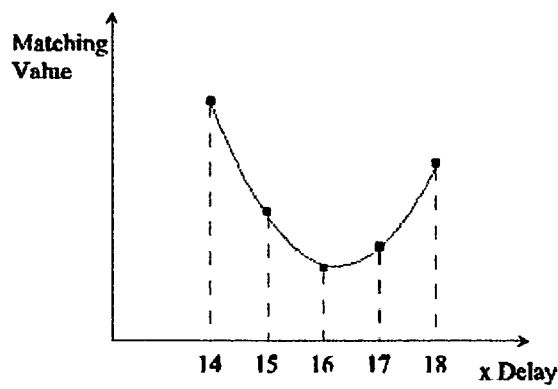
FIG. 3 is a graph showing the determination of the minimum difference between the linear images.

FIG. 1 schematically shows a device for measuring the speed of movement of an object. In FIG. 1, the fixed sensor is represented. However, it is clear that the sensor could have been mobile in relation to the object or that the object and the sensor could have been mobile.

The device comprises:

a bi-linear sensor 1 taking two parallel linear images 1A and 1B;

a lens 2 focusing the image of the moving object 3, the said object moving in the direction D parallel to the plane in which are placed the sensors of linear images 1A and 1; and a processor 4 to process the linear images.

When the object 3 moves in front of the sensor 1, a part of the object passes, at a first time, in front of the image sensors 1A and at a second time in front of the image sensors 1B. In the form of realisation represented, the object 3 moves in a direction parallel to the plane in which are placed the sensors of images 1A and 1B. The sensors of linear images 1A, 1B are parallel to each other, but take images in distinct directions forming between them an angle of at least 3°. The sensors are a short distance apart from each other, for example a distance corresponding to less than 10 times the size of a pixel, preferably less than 5 times the size of a pixel.

The receiver 1 has a series of sensors (for example placed in rows) to define each linear image in a series of pixels whose degree of greyness (white/grey/black) is defined by a voltage or a difference of potential. Each linear image is for example defined by 512 to 2000 pixels, or more such as 5000, 8000 or even more.

The processor 4 receives signals from the sensor to define the linear images. The working of this processor will now be described in greater detail.

The sensors of image 1A send parameters in function of the degree of greyness of the linear image 1A taken at time t1 and of the successive linear images taken at pre-determined intervals of time t2 (for example t2=0.001 second or less). These parameters are stored in a memory 11 linked to a means defining delays Rtd, corresponding to the intervals of time t2, for example by increment (RtdX=rtd×X). These parameters are filtered (filter 5) to eliminate the background noise and to improve the differentiation of the points or pixels of the image or to increase the contrast of the image or of points of the linear image. These parameters with a delay Rtd1, Rtd2, Rtd3 etc. are sent to the comparison device 6.

The sensors of image 1B send, roughly continuously, parameters in function of the greyness of the linear image 1B, for example as of time t3 which is possibly equal to t1, but which is preferably greater than t1, for example equal to t1+a number of times an increment. The sensors send, for example, for each pixel 5000 parameters per second, or more. After filtering (filter 5) of these parameters, they are sent to the comparison device 6.

In this comparison device, one determines the difference of greyness between the pixels of image 1B and the pixels of image 1A, for different delays (14 rtd, 15 rtd, 16 rtd, 17 rtd, 18 rtd) and one determines a degree of difference for each delay.

Advantageously, several "degree of difference" functions, each corresponding to successive linear images 1B are added together so as to improve the quality factor of the resulting function. The number of functions added together varies for example between 1 and 100, or more. By interpolation of the resulting "degree of difference" versus delay function, the comparison device determines the minimum of the function and thence the delay (16 rtd in the present case) to obtain a linear image 1A best corresponding to image 1B. This delay corresponds, then, to the time necessary for the part of the object 3 photographed by the sensors of the image 1A to be in line with the sensors of the image 1B.

If during its movement the object undergoes variations of position in a direction perpendicular to the direction D and parallel to the plane where the sensors 1A and 1B are placed, the comparison device will determine for each delay several "degree of difference" functions by shifting by1 to several pixels the linear image 1A delayed in relation to the linear image 1B. In this case, only the minimum of the minimums of the "degree of difference" functions will be taken into consideration to determine the delay.

From the shift Δt (for example expressed in a number of lines) and knowing the distance separating the sensors of images 1A and 1B (for example a determined number of lines or of pixels), the distance separating the sensors and the object 3 and the focal length of the lens taking the linear images 1A and 1B, it is possible to determine a speed of movement of object 3. Given that the distance separating the two sensors is small, the measurement of the speed is almost instantaneous.

The distance separating the sensors of the moving object can be detected by one or some known systems 12, such as positional radar etc. This system 12 sends, for example, signals (function of distance) to the comparison device 6 so that this device calculates a speed of movement.

Furthermore, if the speed of the object is known, knowing the shift Δt, the distance separating the sensors 1A and 1B and the lens for taking the linear images 1A and 1B, it is possible to determine the object/sensor distance almost instantly and thus to determine the tri-dimensional form of the object. Advantageously, the linear images are broken down into several segments. Each segment is made up for example of 200 pixels, advantageously of less than 100 pixels or even fewer. The comparison of the segments of linear images 1A and 1B makes it possible to determine the variations of object/sensor distance in the direction parallel to the linear sensors.

In the form of realisation, the process also involves a means 7 for determining a quality factor of the determined delay. Such a factor is for example determined by the form of the "degree of difference" versus delay curve or, more exactly, by the first or second derivative of this curve. This factor will be small if the form of the "degree of difference" versus delay curve is flat or roughly flat or random (non-significant curve). If this factor is too small, the determined delay corresponding to the minimum of the "degree of difference" versus delay curve is considered incorrect. For example, this factor of precision or of quality attributes a weight for each delay which corresponds for example to the discrepancy in relation to the curve of the second order which best approaches the discrete "degree of difference" function and determines a probability or degree of probability that the delay corresponding to the minimum of the curve will really be the minimum of this curve.

This means 7 sends a signal to an attenuator 8 to weight the discrepancy in speed measured (or the difference in distance measured in the case of a determination of sensor/object distance) in function of the reliability of the measurements.

We have described above the determination of the speed of the object 3 at a determined moment. It is clear that one can determine this speed at different successive moments.

To do this, the sensors of image 1A take a series of images at regular or irregular time intervals. The parameters of these different images are then analysed successively in the manner described above. In this case, the factor of quality and the attenuator 8 are used to reduce the influence of an imprecise value on the evolution of the speed. For example, in the case where the precision is considered as being too low, the speed previously measured is maintained. For example, one can apply a Kalman recursive filter where each measurement is weighted in function of its variance.

If the object 3 does not expose a surface which is flat and parallel to the plane of the sensors of images 1A and 1B, measurement errors will be generated depending on the tri-dimensional form of the object. To reduce the influence of these errors, it is advantageous to adapt the speed calculated progressively to the value of he signal coming from the attenuator 8. This adaptation of the speed is realised by means of a filter 9 which is of the low-frequency sort. This filter 9 attenuates all sorts of high-frequency noises which disturb the measurements. In the case of measurements of the distance of the object, this filter reduces the influence of variations of relative speed of the object.

Lastly, it can be advantageous to have feedback of the speed measured on the speed of the taking of images 1A and 1B. Thus, it is advantageous to control the speed of the taking of images 1A and 1B in function of speed measured. In fact, when the speed of the object 3 is low, the speed of the taking of images 1A can be low. The greater the frequency of the taking of linear images 1A and 1B will be, the greater will be the precision of the measurement of speed.

This feedback 10 of the speed measured on the speed of the taking of images is advantageously used in the case where this speed-measuring device is used to pilot a tri-linear colour sensor. By adjusting the speed of acquisition of the colour linear images to the speed of the object in movement, the discrepancy of the three colour images is fixed and corresponds to the inter-line distance of the sensor when the images have square pixels.

This feedback is also advantageously used in the case where this measuring device is used to pilot a TDI (Time delay integration) sensor. For its functioning, this sensor requires an excellent synchronisation between the speed of the taking of linear images of the object in movement. This makes it possible to use this sensor for taking images of an object in movement at a variable or unknown speed.

The forms of realisation represented above are described only as an example.

It is clear that numerous modifications are possible.

Thus, the sensors 1A and 1B instead of being mono-linear sensors can be sensors made up of several lines, for example 2 to 20 line images, in particular 3 to 10 lines, i.e. sensors to take a group of linear images. The use of images containing a limited group of linear images makes it possible to determine for each linear image of the image 1B the delay corresponding to the best degree of correspondence. One thus determines for each linear image of the image 1A the optimal delay of correspondence and from that one can determine an optimal average delay on the basis of determined optimum delays.

The sensors can also be adapted to take one or several segments of a line of pixels or of a series of lines. This makes it possible to make an analysis in function of the height. This makes it possible to correct the values to be attributed to a parameter (for example, speed, acceleration) due for example to a slight shift in height of the object in movement relative to the sensors or due to a movement of a part of the object relative to another part of the object, or yet again due to the form of the object or to the variation of forms of the object.

By using sensors capable of taking several distinct segments of a line or of a series of lines, it is also possible to compare the development of second images of a segment in relation to the development of first images of another segment in order to determine whether a second image of the segment under consideration corresponds to a first image of another segment. Such an analysis then makes it possible to take into consideration a vertical movement of the object and to take account of any vertical movement when seeking the speed of the object.

The device can also contain a means of processing linear images or series of linear images taken by the sensors to segment them into several distinct sections. The device will in this case be able to compare images of a first development of images of a first segment with one or more images of a second development of images (taken with a shift relative to that of the first development) of a segment corresponding to the first segment or to another segment.

The sensors 1A and 1B are for example black and white sensors. However, it can be advantageous to take linear images in one colour or several different colours, for example in red, blue and green. The use of an image of a particular or different colour makes it possible for example, if the object is of a particular colour, better to determine the position of the image relative to the background noise. It can also be useful to determine, for linear images 1B of different colour, to determine for each of the colours the delay for which the degree of correspondence is best. It is thus possible to determine either an average delay on the colours or to maintain the delay of a colour for which the degree of precision is the best.

Instead of using colour sensors 1A and 1B, it is possible to use infra-red, radiation etc sensors. Infra-red images seem to be useful to determine the speed of movement of a warm part of the moving object, for example a reactor etc.

The comparison device uses one or more known comparison processes or algorithms such as the sum of the absolute values of the difference in the pixels of two images. Such algorithms are for example described in Computer Vision (Prentice Hall).

Filter 5 is advantageously a filter making it possible to increase the image contrast, to reduce the background noise, to improve the differentiation, and such a filter is for example a high-channel filter. A filter 5 makes it possible to improve the performance of the comparison device 6.

The image-sensor set can be devised with CCD or CMOS technology or others. This sensor set can consist of a line-by-line addressable matrix sensor whose exposure to light is done at the same moment for each line, with this sensor being able to be considered as a sensor consisting of several linear sensors.

The method and the device according to the invention can be applied in numerous ways such as determining the speed of moving objects, taking virtual 3D images (scanner of existing buildings) etc.

Tests have been carried out to determine the correct working of the method according to the invention.

For these tests, a computer was used (PC, data-processing system) linked by a frame grabber to a camera and to a sensor (for example IR) intended to launch the data capture.

When the object (such as a car) cuts the sensor's IR field, the data-capture process is launched.

The camera is equipped with a line-by-line addressable matrix sensor. Only a certain number of pairs of lines are used, for example fewer than 10 pairs and particularly 2, 3 or 4 pairs of lines. Each line of the camera will make it possible to acquire an image in the manner of a scanner. In the tests carried out, three pairs of lines were used. The lines of one pair are slightly spaced so as to reduce the difference of shot angle, as this enables one to obtain, for each pair, two quasi-identical linear images. After a certain time, each pair of lines will have seen the object pass and will have generated a development of couples of images.

These three developments of couples of images are then processed in the PC to determine a speed curve for each couple of images (a first speed curve from the images taken by the first pair, a second speed curve from the images taken by the second pair and a third speed curve from the images taken by the third pair of lines).

A first test was carried out on a small mobile 80 cm away from the camera. The image was taken at 8 bits per pixel; the position of the first line was 600–616 for the first pair, 800–816 for the second pair and 1000–1016 for the third pair. The exposure time was chosen in function of the luminosity. In function of the exposure time chosen, each sensor will take an image corresponding to a number of lines of pixels, i.e. a series of adjacent lines.

Figure 4:
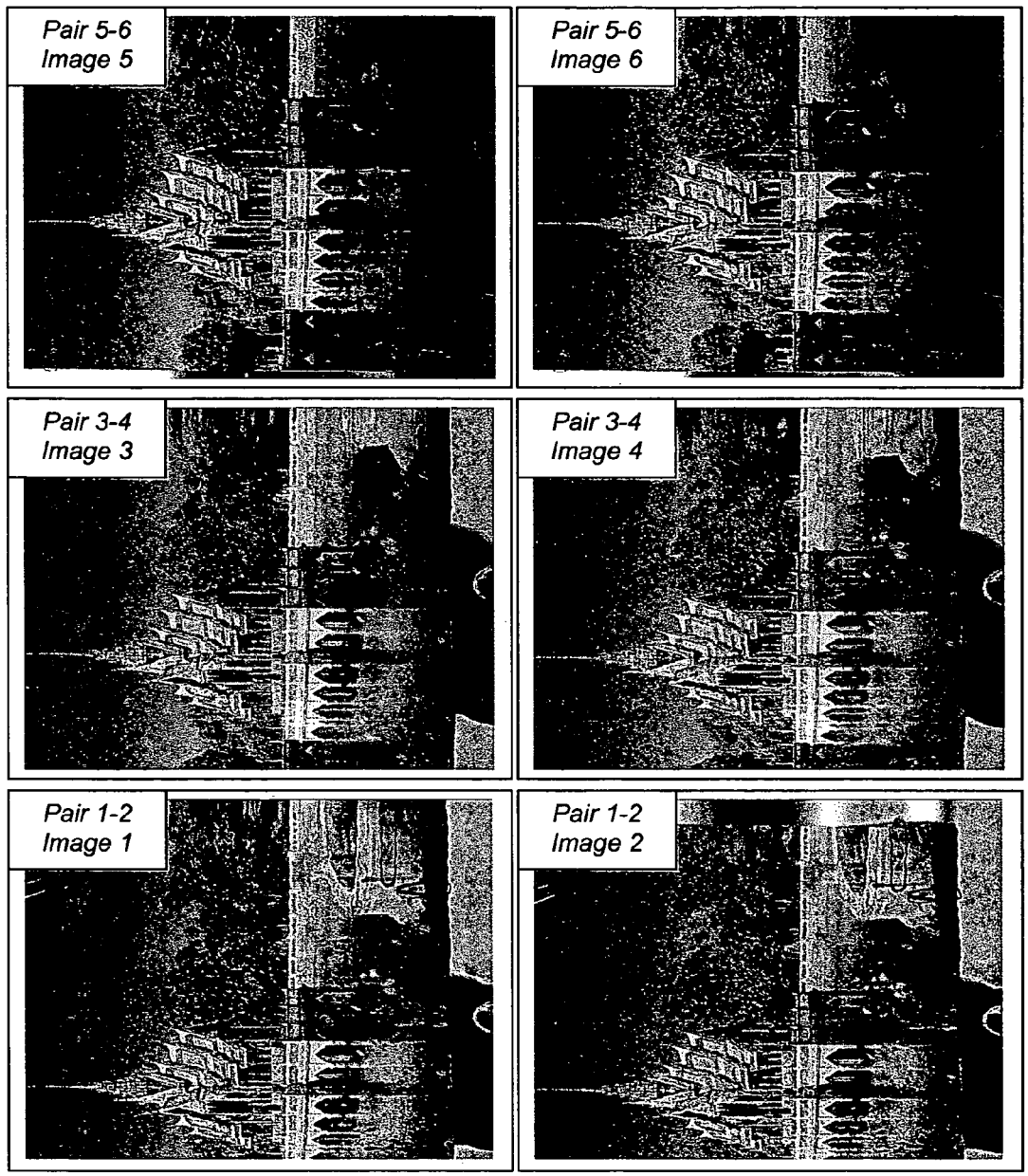
FIG. 4 is a representation of three pairs of developments of images taken by three pairs of lines of view shots.

In FIG. 4 are represented the six developments of images taken by the different lines. On this figure one sees that the first pair of lines gives a front development of images (view of vase 100), that the third pair of lines gives a rear development of images (view of bridge 101) and finally that the second pair of lines gives a development of central images. With 102, one has represented the direction of movement of the object (in this case represented by a photo borne by a support, the photo moving parallel to the plane of the camera).

The processing of correspondence of the images in the PC was carried out with the following parameters:
  width of the matching strip: 10 pixels
  space between the two strips: 10 pixels
  number of iterations: 30 per step of one pixel.

Figure 5:
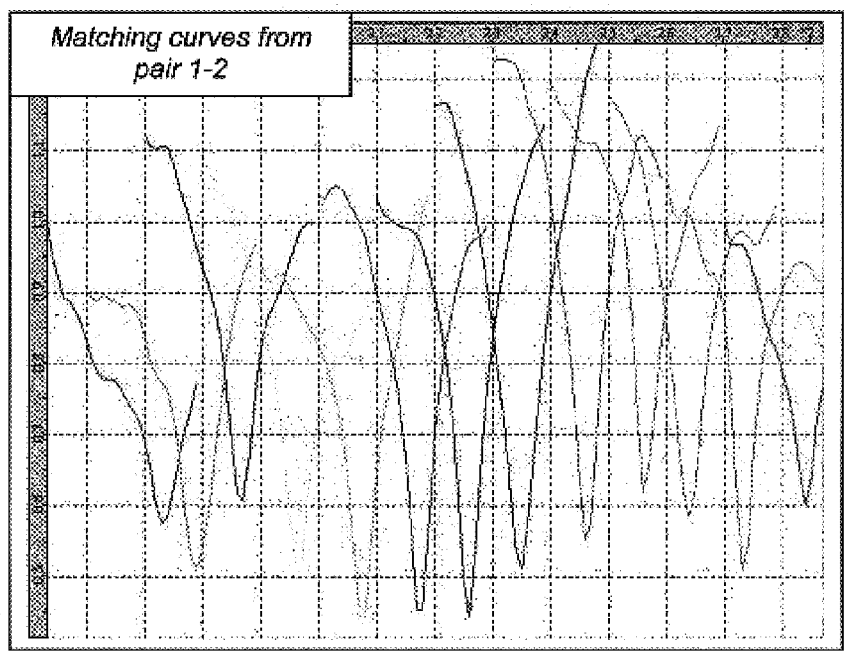
FIG. 5 is a graph showing the matching curves between image 1 development and image 2 development.
Figure 6:
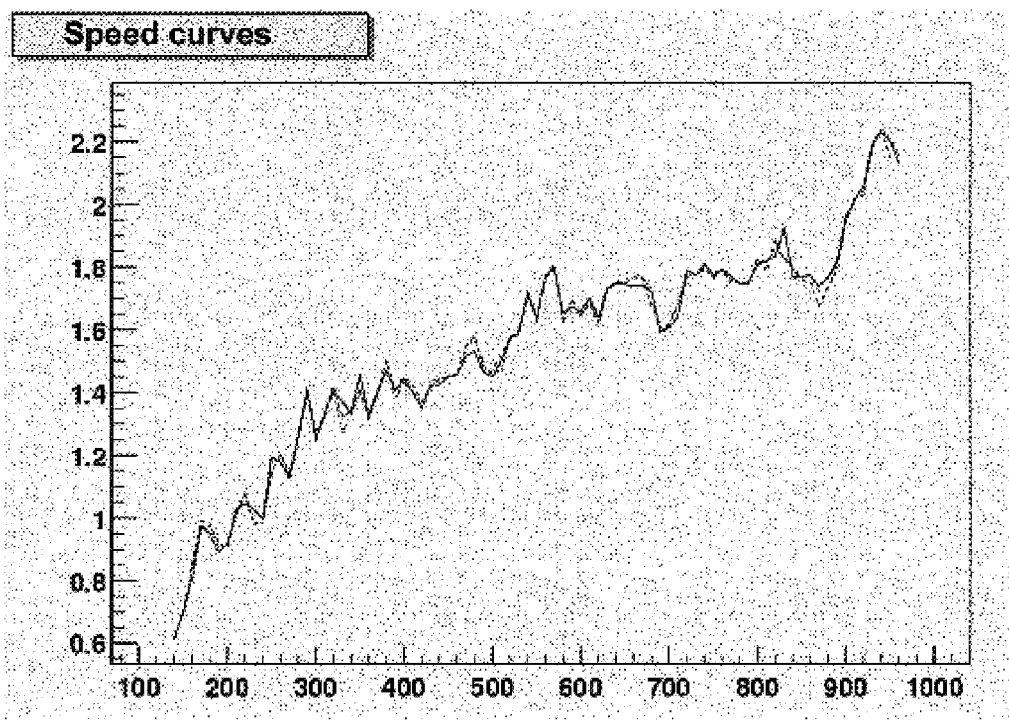
FIG. 6 is a graph representing the speed curves (in function of time) determined from the matching curves.

For each couple of development of images (for example pair 1-2, pair 3-4, pair 5-6), for each pair, one determines curves of correspondence(degree of difference) between the images of each pair (matching curve between images 1 and 2 etc). Matching curves between images 1 and 2 are represented in FIG. 5. Matching curves showing a low minimum, for example below 0.6, advantageously below 0.5 or even less, indicate an almost perfect super-imposing of a strip of the first image with a strip of the second image.

From the matching curves of the images of each of the pairs, the PC determines instantaneous speeds of the object in function of time. In fact, the PC determines a speed curve for each pair. The super-imposition of the speed curves determined for each of the pairs is a check as regards the exactness of the instantaneous speed value relative to the degree of precision of the measurement of the speed. The presence of up-and-down variations is due to a non-constant acceleration of the mobile object and to its vibrations during its movement.

Tests were then carried out on the movement of a car 5 meters away from the camera.

These tests were carried out using a device similar to that used in the preceding test. The parameters concerning the camera were:
  image in 8 bits per pixel
  position of the lines: 100–116; 500–516; 900–916 (3 pairs of lines)
  exposure time in function of the luminosity
  The parameters concerning the processing were:
  width of matching band: 50 pixels
  space between two bands: 25 pixels
  number of iterations: 30 per step of 1 pixel.

FIGS. 7A, 7B, 7C, 7D, 7E and 7F show the developments of images taken by the different lines of the pairs of image-shot lines. The car moves in such a way that a part of the car passes first in front of the first pair (pair 1-2), then in front of the second pair (3-4) and finally in front of the third pair (5-6).

It can be noticed that the front of the car is compressed while the rear is lengthened in the developments of images. A compression of the forms of the image reflects an acceleration of the vehicle (increase in speed relative to the passage of time) or a high speed, while a lengthening of the forms of the image reflects a slowing down or deceleration. A simple examination of the developments of images thus makes it possible to determine if the car is accelerating or slowing down. In the present case, it emerges that the car is braking because the front is compressed while the rear is lengthened.

Figure 8:
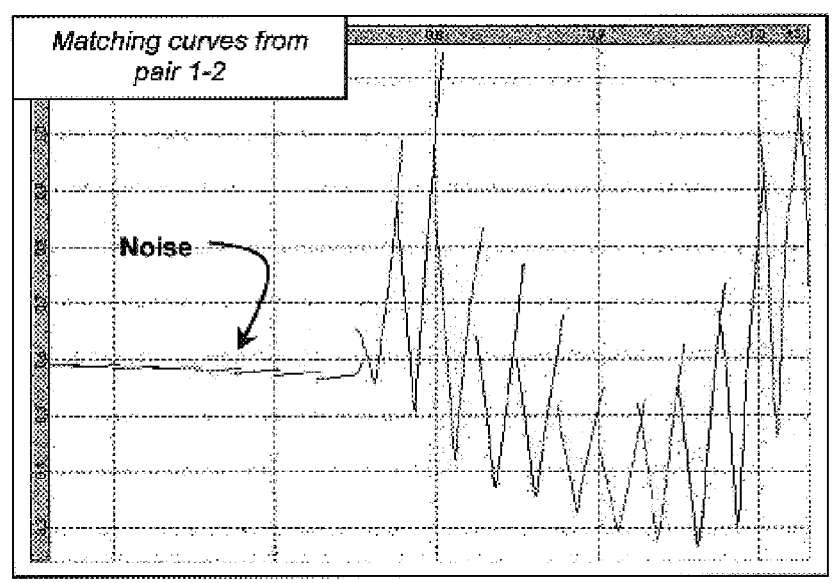
FIG. 8 is a graph showing the matching curves between the developments of images 1 and 2.

FIG. 8 shows the matching curve between development of image 1 and the development of image 2. The noise determined before the up-and-down curves is due to the matching curves of the image background.

Figure 9:
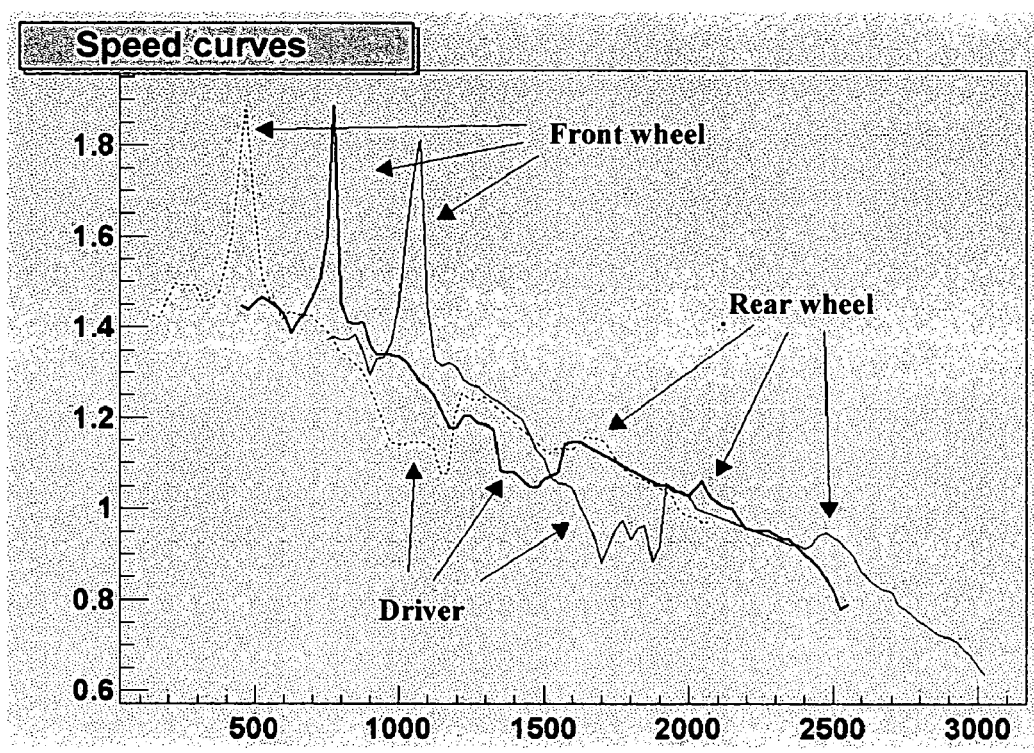
FIG. 9 is a graph of the speed curves in function of time.

From the matching curves, one determines the curve of the car speed (FIG. 9, one curve for each pair of lines).

From this figure, one notes that on average the curve tends to decrease, which proves that the car is decelerating.

On the left-hand part of FIG. 9, one notices a peak, this peak corresponding in fact to the speed measured for the front wheel. The upper part of the hub-cap is advancing faster than the lower part (the rays are closer together in the upper part than in the lower part). This can be seen on FIG. 9 by a localised increase of the speed or peak (the peaks are indicated by the front wheel on FIG. 9).

Similarly, on the right-hand part of FIG. 9, one notices upward bumps corresponding to an increase in speed caused by the rear wheel of the vehicle. These bumps are not as pronounced as the speed peaks for the front wheel, and this seems to be due to the form of the vehicle which presents oblique transitions of the vehicle.

At the centre of the curve, one notices troughs or deceleration, corresponding to the presence of the driver. The driver is further away from the camera than the passenger door, and his speed seems to be lower than the visible part of the car. The method thus makes it possible to detect the distance of the driver relative to the lateral surface of the car.

The tri-dimensional effects on the measurements of speed along with the errors introduced by the wheels can be detected by the fact that they are spaced in time for the 3 pairs of lines and by the abrupt or rapid variations of the measurements given the car's inertia. The time gap (for example between the peaks, bumps or troughs) represents the time taken by a determined part of the vehicle to pass from one pair of lines to another pair of lines.

The above example was repeated except that each sensor senses a series of segments of lines, for example segments which are at a distance corresponding to a number of pixels apart from each other. This makes it possible to analyse the speed curves for each of the segments of the pairs of sensors. Thus, by comparing the speed curve of one segment of lines or of series of lines of one sensor with the speed curve of another segment of lines or of series of lines of the same sensor, it is possible to determine the influence of the distance of the object or of a movement of a part of this object. This comparison thus makes it possible to determine the speed curve which best corresponds to the speed of the object, not taking into account a part of the vehicle which brings about a distortion of the measurement of the speed (wheels, inclined form etc.).

Finally, by comparing the different speed curves of the different segments of the three pairs of sensors, it is possible to check, segment by segment, the development of the speed over time. This segment-by-segment analysis is also useful for ensuring the validity of the value and/or the validity of the method used. Indeed, if a sensor happened to fail to function correctly, the analysis of the speed curves of the different segments will directly reveal the error and thus the defective sensor.

What is claimed is:

1. A method to characterise, at least partially, a movement of an object relative to a measurement device, this method determining at least one time-function parameter,
   in which, by means of a measurement device, from a first determined time, a series of at least three successive first time-spaced linear images are taken in a shot-direction, at a determined time interval, said series forming a first element, and at least, from a second determined time later than the first determined time, at least one second linear image or a series of second linear images of the object in relative movement is taken, forming a second element wherein each second linear image is taken in a direction forming an angle with the shot-direction of the first time-spaced linear image, each second linear image being spaced from the first time-spaced linear images,
   in which (a) a first development of images in function of time made up of at least a first element and (b) a second development of image made up of at least a second element are formed,
   in which at least partially at least one linear image of the first development is compared with at least a part of a linear image of the second development to determine the part of time-spaced linear image of the first development which best corresponds to a part of a linear image of the second development and to determine at least one time-function parameter for which at least a part of the first time-spaced image of the said period best corresponds to a part of a second linear image.

2. The method of claim 1, wherein the first linear images are taken in a first direction and each second linear image in a second direction, this second direction forming an angle with the first direction of less than 10°.

3. A method to characterise, at least partially, a movement of an object relative to a measurement device, this method determining at least one time-function parameter,
   wherein by means of a measurement device, from a first determined time, a series of at least three successive first linear images are taken in a shot direction, at a determined time interval, and at least, from a second determined time later than the first determined time, a series of second linear images of the object in relative movement are taken, said second linear images being taken in a direction forming an angle with the shot-direction of the first images and being spaced from the first images,
   wherein (a) a first development of images in function of time consisting of at least a series of first linear images spaced in time taken from the first determined time and (b) a second development of images made up of a series of second spaced linear images taken at a determined time interval are formed, and
   wherein at least partially, at least one linear image of the first development is compared with at least a part of at least one linear image of the second development to determine the part of at least one time-spaced linear image of the first development which best corresponds to a part of one linear image of the second development and to determine at least one time gap for which at least a part of a first spaced linear image best corresponds to a part of a second linear image.

4. The method of claim 1,
in which the first element consists of a series of groups of spaced first linear images of the object in relative movement taken from of a first determined time, these groups being spaced in time, and in which the second element consists of at least one group of second linear images taken at a time later than the first determined time,
in which (a) the first development of images in function of time consists at least partially of a series of groups of first linear images taken from a first determined time is formed and (b) the second development comprises at least partly a group of second images,
in which at least partially, a part of groups of linear images of the first development is compared with at least a part of at least one group of second linear images of the second development, to determine the part of the group of linear images of the first development which best corresponds to a part of the group of second linear images and to determine a time-function parameter for which at least a part of a group of linear images of the first development best corresponds to a part of the group of second linear images.

5. The method of claim 1,
in which at least for a part of linear images of the first development, a parameter selected from the group consisting of factor of correspondence and a gap in correspondence with at least one second linear image of at least a part of the second development is determined,
in which an optimum parameter selected from the group consisting of the maximum of the factor of correspondence and the minimum of gap of correspondence is determined for determining a first element selected from the group consisting of one single spaced linear image and a group of spaced linear images of the first development which best corresponds to a second element selected from the group consisting of a single linear image and a group of second linear images of the second development.

6. The method of claim 1, wherein at least partially, an element selected from the group consisting of linear images, the first development and the second development is filtered before determining at least the part of time spaced linear image of the first development of which at least a part best corresponds to a part of a linear image of the second development.

7. The method of claim 1, wherein, for at least one linear image taken by a sensor, a compensation is carried out in function of at least one factor selected from the group consisting of distribution of light on the sensor, difference of sensitivities of pixels of linear elements of the sensor, differences and variations bringing about systematic errors in the comparison of linear images.

8. The method of claim 1, wherein the linear images are taken by means of at least one sensor, whereby in order to determine a speed of the object relative to the sensor, the distance between the measurement device and the object in movement relative to the measurement device is determined.

9. The method of claim 8, wherein a relative speed of the object is determined in relation to the sensor from at least one parameter selected from the group consisting of:
the gap of time separating the taking of a first spaced linear image and the taking of a second linear image, for which at least a part of a first spaced linear image best corresponds to a part of a second linear image,
the distance between the object and the sensor,
the angular difference between the shot directions of linear images,
the focal length of a camera taking at least one linear image and
the distance separating two linear sensors taking linear images.

10. The method of claim 1, wherein the object is located at a distance from at least one sensor of a camera taking linear images time-spaced of a period of time, whereby the distance separating the object from the sensor is determined from:
the period of time separating the taking of a first spaced linear image and the taking of a second linear image, for which at least a part of a first spaced linear image best corresponds to a part of a second linear image,
the angular difference between the shot directions of first and second linear images,
the focal length of the camera taking linear images,
the distance separating the two linear sensors taking linear images, and
the relative speed separating the object from the sensor.

11. The method of claim 1, wherein the first linear images formed each of a series of pixels are taken by at least one sensor defining a plane in which the at least one sensor is operative, and in that the object is subject to a relative movement in relation to the at least one sensor parallel to the plane in which the at least one sensor is operative.

12. The method of claim 1, wherein at least a first pair of parallel linear images and a second pair of parallel linear images are taken successively in time, in which at least a first pair of developments of images is formed from the first successive pairs of images and a second pair of developments of images from the second successive pairs of images, in which from the first pair of developments a first time-function parameter is determined and from the second pair of developments a second time-function parameter is determined, and in which this first parameter is compared with this second parameter to determine an accuracy degree selected from the group consisting of degree of exactness and degree of error of the value given to the said first parameter.

13. The method of claim 1, wherein over time a series of images corresponding to segments of a first linear image and of a second linear image are taken, so as to form a series of developments of first segment linear images and a series of second segment linear images, and in which at least partially, at least one image of a development of a first segment image are compared with at least one image of a development of a second segment image.

14. A measurement device for establishing a method to characterise, at least partially, a movement of an object relative to a measurement device, this method determining at least one time-function parameter,
in which, by means of the measurement device, from a first determined time, a series of at least three successive first time-spaced linear images are taken in a shot-direction, at a determined time interval, said series forming a first element, and at least, from a second determined time later than the first determined time, at least one second linear images or a series of second linear images of the object in relative movement is taken, each second linear image being taken in a direction forming an angle with the shot-direction of the first image, each second linear image being spaced from the first linear images, in which (a) a first development of images in function of time made up of at least a first element and (b) a second development of image made up of at least a second element are formed, in which at least partially at least one linear image of the first development is compared with at least a part of a linear image of the second development to determine the part of time-spaced linear image of the first development which best corresponds to a part of a linear image of the second development and to determine at least one time-function parameter for which at least a part of the first time-spaced image of the said period best corresponds to a part of a second linear image, said device including at least:

a sensor set taking at least one series of first linear images by a first sensor means and at least one second linear image by a second sensor means, in particular taken at successive times, the said second linear images being taken from a different angle relative to the first linear image, a means generating a series of first images spaced in time, a comparison device receiving signals from the sensor set and from the means generating a series of first images spaced in time, this comparison device comparing, at least partially, the series of first time-spaced images with at least one second linear image and determining, for at least a part of the series of first spaced images a parameter selected from the group consisting of a factor of correspondence and a discrepancy of correspondence with at least a part of a second linear image, this comparison device being programmed for determining a time parameter corresponding to an optimum parameter selected from the group consisting of a maximum factor of correspondence and a minimum of discrepancy of correspondence between at least a part of a first linear image spaced in time and at least a part of a second linear image.

15. The device of claim 14, wherein the first sensor means is arranged to take at least one linear image in a first direction, while the second sensor means is arranged to take at least one linear image in a second direction, this second direction forming an angle with the said first direction of less than 10°.

16. The device of claim 15, wherein the sensor set takes linear images in the form of a set of pixels and attributes to each pixel a parametric value, this set moreover comprising a means of correction of the parametric value attributed to pixels of at least one image selected from the group consisting of at least one second linear image and first linear images spaced in time, in function of at least one parameter selected from the group consisting of distribution of light, differences and variations bringing about systemic errors in the comparison of the images and differences of sensitivity of sensor means.

17. The device of claim 14, wherein the device comprises a sensor, at least bi-linear, defining a plane of image reception and focalisation lens focalising an image of an object in movement relative to the said reception plane of the sensor.

18. The device of claim 14, which comprises:

a sensor comprising at least a first means receiving a first series of rows of pixels or lines of an image and a second means receiving a second series of rows of pixels or lines of the image at least partially distanced from the pixels of the first row or line, a delay memory which memorises, at least partially, the first series of rows of pixels or lines and which emits, with pre-determined delays, the values memorised corresponding to that first series of rows of pixels or lines, a comparison device receiving signals from the sensor corresponding to the values of the pixels of the second series of rows or lines over time, and signals coming from the delay-memory, this comparison device being programmed for determining the delay to attribute to the first series of rows of pixels or lines for which the values memorised corresponding to the said first series of rows of pixels or lines best correspond to the values of the second series of rows of pixels or lines.

19. The device of claim 18, wherein the comparison device determines, for delays pre-determined by the delay-memory, a difference of value of pixels between the pixels of the first row taken at different moments and the value of the pixels of the second row, and emits signals comprising the differences of values of pixels associated to pre-determined delays to a processor which determines, by calculation step selected from the group consisting of interpolation, extrapolation, approximation, successive iteration, and combinations thereof, the delay for which the difference of value of pixels is minimal.

20. The device of claim 14, which comprises a focalisation lens including a cylinder lens.

21. The device of claim 14, which comprises distinct focalisation lenses for each means sensing a row of pixels.

22. The device of claim 14 which comprises at least one filter for the linear images.

23. The device of claim 14, which comprises a means of checking the quality of the parameter determined by the processor, this means advantageously comprising a means to determine a factor of quality from signals coming from the processor and an attenuator receiving the factor of quality determined and weighting the parameter determined by the processor in function of the factor of quality.

24. The device of claim 14, which comprises a low-channel filter to attenuate variations selected from the group consisting of errors due to the tri-dimensional form of the object in relative movement and high-frequency noises introduced into the measurements.

25. The device of claim 14, wherein the sensor set receives signals coming from the comparison device.

26. The device of claim 14, wherein the sensor set takes at least one first linear image and at least one second linear image, said first and second linear image being selected from the group consisting of images in at least two colours and linear RGB images.

27. The device claim 26, wherein the sensor set comprises at least 2 linear sensors.

28. A method to characterise, at least partially, a movement of an object relative to a measurement device, this method determining at least one time-function parameter, in which, by means of a measurement device, from a first determined time, a series of at least three successive first time-spaced linear images are taken in a shot-direction, at a determined time interval, said series forming a first element, and at least, from a second determined time later than the first determined time, at least one second element selected from the group consisting of one single second linear image and a series of second linear images of the object in relative movement is taken, each second linear image being taken in a direction forming an angle with the shot-direction of the first image, each second linear image being spaced from the first linear images, in which (a) a first development of images in function of time made up of at least a first element and (b) a second development of image made up of at least a second element are formed, in which at least partially linear images of the first development are compared with at least a part of linear images of the second development to determine the part of time-spaced linear images of the first development which best correspond to a part of linear images of the second development and to determine at least one time-function parameter for which at least a part of the first time-spaced images of the said period best corresponds to a part of second linear images.

29. The method of claim 1, in which the first linear images are taken in a first direction and each second linear image in a second direction, this second direction forming an angle with the first direction of less than 5°.

30. The method of claim 1, in which the first linear images are taken in a first direction and each second linear image in a second direction, this second direction forming an angle with the first direction of less than 3°.

31. A method to characterise, at least partially, a movement of an object relative to a measurement device, this method determining at least one time-function parameter, in which by means of a measurement device, from a first determined time, a series of at least three successive first linear images are taken in a shot direction, at a determined time interval, and at least, from a second determined time later than the first determined time, a series of second linear images of the object in relative movement are taken, said second linear images being taken in a direction forming an angle with the shot-direction of the first images and being spaced from the first images, in which (a) a first development of images in function of time consisting of at least a series of first linear images spaced in time taken from the first determined time and (b) a second development of images made up of a series of second spaced linear images taken at a determined time interval are formed, and in which at least partially, linear images of the first development are compared with at least a part of linear images of the second development to determine the part of time-spaced linear images of the first development which best corresponds to a part of linear images of the second development and to determine at least one time gap for which at least a part of a first spaced linear images best correspond to a part of second linear images.

32. The method of claim 31, in which the time gap is expressed as a number of lines of pixels.

33. The method of claim 1, in which the first element consists of a series of groups of spaced first linear images of the object in relative movement taken from of a first determined time, these groups being spaced in time, and in which the second element consists of at least a series of groups of time-spaced second linear images at least taken from a time later than the first determined time and at a determined interval of time, in which (a) the first development of images in function of time consists at least partially of a series of groups of first linear images taken from a first determined time is formed and (b) the second development comprises at least partially of a series of groups of second linear images in function of time taken from an angle different from the shot direction of the group of first linear images, in which at least partially, a part of groups of linear images of the first development is compared with at least a part of groups of second linear images of the second development, to determine the part of the group of linear images of the first development which best corresponds to a part of the group of second linear images and to determine a time-function parameter for which at least a part of a group of linear images of the first development best corresponds to a part of the group of second linear images.

34. The method of claim 1, in which the linear images are taken by means of at least one sensor, whereby in order to determine an acceleration of the object relative to the sensor, the distance between the measurement device and the object in movement relative to the measurement device is determined.

35. The method of claim 1, in which the linear images are taken by means of at least one sensor, whereby in order to determine an acceleration of the object relative to the sensor, the measurement device is placed at a known distance, at least for a given time, relative to the object in movement relative to the measurement device.

36. The method of claim 1, in which the linear images are taken by means of at least one sensor, whereby in order to determine an speed of the object relative to the sensor, the measurement device is placed at a known distance, at least for a given time, relative to the object in movement relative to the measurement device.

37. The method of claim 1, in which the second linear images formed each of a series of pixels are taken by at least one sensor defining a plane in which the at least one sensor is operative, and in that the object is subject to a relative movement in relation to the at least one sensor parallel to the plane in which the at least one sensor is operative.

38. The method of claim 1, in which over time a series of images corresponding to segments distant from each other, of a first linear image and of a second linear image are taken, so as to form a series of developments of first segment linear images and a series of second segment linear images, and in which at least partially, several first linear segment images are compared with several second linear segment images.

39. The device of claim 14, in which the first sensor means is arranged to take at least one group of linear images in a first direction, while the second sensor means is arranged to take at least one group of linear images in a second direction, this second direction forming an angle with the said first direction of less than 10°.

40. The device of claim 14, in which the first sensor means is arranged to take at least one linear image in a first direction, while the second sensor means is arranged to take at least one linear image in a second direction, this second direction forming an angle with the said first direction of less than 5°.

41. The device of claim 14, in which the first sensor means is arranged to take at least one linear image in a first direction, while the second sensor means is arranged to take at least one linear image in a second direction, this second direction forming an angle with the said first direction of less than 3°.

42. The device of claim 18, in which the distance separating these first and second series of rows or lines is a multiple of the size of a pixel, these rows or lines being parallel to each other.

43. The device of claim 18, in which the comparison device is linked to a processor to determine the delay to attribute to the first series of rows of pixels or lines for which the values memorised corresponding to the said first series of rows of pixels or lines best correspond to the values of the second series of rows of pixels or lines.

44. The device of claim 14, which comprises several filters for the linear images.

45. The device of claim 14, which comprises an processing means selected from the group consisting of a processor determining a time parameter, an attenuator adapting the frequency of shots of linear images, and an attenuator adapting an increment of delay between two shots of linear images, and in which the sensor set receives signals coming from at least one processing means.

46. The device of claim 14, in which the sensor set comprises at least one matrix sensor which is addressable line by line.

* * * * *